United States Patent
Reicheneder et al.

[15] 3,697,522
[45] Oct. 10, 1972

[54] PYRIDAZONE DERIVATIVES

[72] Inventors: Franz Reicheneder; Rudolf Kropp, both of Ludwigshafen; Adolf Fischer, Mutterstadt, all of Germany

[73] Assignee: Badische Anilin- & Soda-Fabrik Aktiengesellschaft, Ludwigshafen/Rhine, Germany

[22] Filed: Feb. 3, 1969

[21] Appl. No.: 796,182

[30] Foreign Application Priority Data

Feb. 10, 1968 Germany..........P 16 70 315.4

[52] U.S. Cl. .................................260/250 A, 71/92
[51] Int. Cl. ..............................................C07d 51/04
[58] Field of Search........................................260/250

[56] References Cited

UNITED STATES PATENTS 3,520,886  7/1970  Reicheneder et al......260/250
3,210,353  10/1965  Reicheneder et al......260/250

Primary Examiner—Nicholas S. Rizzo
Attorney—Johnston, Root, O'Keeffe, Keil, Thompson & Shurtleff

[57] ABSTRACT

New and valuable pyridazone derivatives, especially m-trifluoromethylphenyl pyridazone derivatives, and a process for controlling unwanted plants with these compounds.

4 Claims, No Drawings

PYRIDAZONE DERIVATIVES

The present invention relates to new pyridazone derivatives, viz. substituted 1-m-trifluoromethylphenyl pyridazone derivatives.

It is known to use 1-phenyl-4-methoxy-5-chloropyridazone-(6) as a herbicidal ingredient (British Pat. No. 917,849).

It is further known to use N-p-chlorophenyl-N'-dimethylurea as a herbicidal ingredient. The use of 2-chloro-4,6-bis-(ethylamino)-s-triazine as a herbicidal ingredient is also known. However, the results obtainable with these compounds are often unsatisfactory.

An object of the invention is new and valuable pyridazone derivatives. A further object of the invention is new and valuable m-trifluoromethylphenyl pyridazone derivatives. Another object of the invention is a process for controlling unwanted plants with new and valuable pyridazone derivatives without damaging crop plants. These and other objects of the invention are achieved by pyridazone derivatives having the formula

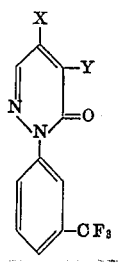

in which X denotes an alkoxy, thioalkyl, amino, acetylamino, halo-acetylamino, dimethylformamidine, methylformamidine, alkylamino or an isocyanato radical, the group —NH-CO-COOR, NH—CO-COSR, —NH—CO—NHR, —NH—COOR, —NH—CO—SR,

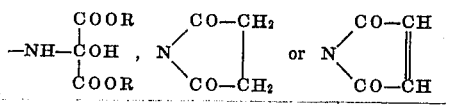

R denoting a substituted or unsubstituted alkyl, cycloalkyl, aralkyl or aryl radical or hydrogen, and the salts of these compounds, and in which Y denotes chlorine, bromine or an alkoxy or thioalkyl group.

By salts we mean the alkali and ammonium salts of ammonia and of organic amines.

These compounds have a particularly strong action on the plants Echinochloa crus-galli, Digitaria sanguinalis, Amaranthus retroflexus and Lamium amplexicaule when used in amounts of 2 to 5 kg of active ingredient per hectare.

The new pyridazone derivatives may be prepared by reaction of m-trifluoromethylphenylhydrazine with mucochloric acid or mucobromic acid and reaction of the 1-m-trifluoromethylphenyl-4,5-dihalopyridazone-(6) thus obtained with alkylamines or alcoholates or ammonia, and, if desired, by further reaction of the 1-m-trifluoromethyl-phenyl-4-amino-5-chloropyridazone-(6) thus obtained with acid chlorides, formamides, oxalyl chloride or malonic acid derivatives.

Production of 1-m-trifluoromethylphenyl-4-methoxy-5-chloropyridazone-(6)

8 parts by weight of a 30 percent by weight methanolic sodium methylate solution is added to 9 parts of 1-m-trifluoromethylphenyl-4,5-di-chloropyridazone-(6) in 100 parts of methanol and this mixture boiled for 30 minutes on a steam bath. The reaction mixture is then poured into 200 parts of water and the precipitated 1-m-trifluoromethylphenyl-4-methoxy-5-chloropyridazone-(6) is suction-filtered. Melting point: 152° to 153° C. (from methanol).

Examples of new compounds are as follows:

| | |
|---|---|
| 1-m-trifluoromethylphenyl-4-methoxy-5-chloropyridazone-(6) | m.p. 152 to 153°C |
| 1-m-trifluoromethylphenyl-4-methoxy-5-bromopyridazone-(6) | m.p. 154°C |
| 1-m-trifluoromethylphenyl-4-amino-5-bromopyridazone-(6) | m.p. 172 to 174°C |
| 1-m-trifluoromethylphenyl-4-amino-5-chloropyridazone-(6) | m.p. 174 to 175°C |

Production of 1-(m-trifluoromethyl)-phenyl-4,5-dichloropyridazone-(6)

A solution of 212.5 parts by weight of m-trifluoromethylphenyl hydrazonium chloride in 2,000 parts of a 10 percent by weight aqueous hydrochloric acid is heated to 80° to 90° C.; 169 parts of mucochloric acid is then added. The mixture is stirred for two hours at 80° to 90° C., during which time the pyridazone, is deposited at the bottom of the flask in the form of an oil. Upon cooling the pyridazone solidifies to give a solid crystalline mass. Yield: 300 parts = 97 percent of the theory; melting point: 90° to 91.5° C. (from methanol).

The new compounds may be applied as herbicides in the form of solutions, emulsions, suspensions or dusts. The form of application depends entirely on the purpose for which the agents are being used; in any case it should ensure a fine distribution of the active ingredient.

For the preparation of solutions to be sprayed direct water mineral oil fractions with medium to high boiling points, such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders by adding water. To prepare emulsions the ingredients as such or dissolved in a solvent may be homogenized in water by means of wetting or dispersing agents, e.g., polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g., clay, diatomite or fertilizer.

The following Examples illustrate the use of the compounds according to the invention.

EXAMPLE 1

Pots having a diameter of 8 cm are filled with loamy sandy soil in a greenhouse and then sown with the seeds of Indian corn (Zea mays), cotton (Gossypium sp.), annual meadow grass (Poa annua), slender foxtail (Alopecurus myosuroides), barnyard grass (Echinochloa crus-galli), large crabgrass (Digitaria sanguinalis), white goosefoot (Chenopodium album), chickweed (Stellaria media) and amaranth pigweed (Amaranthus retroflexus). The soil prepared in this manner is subsequently treated with 3 kg per hectare of 1-m- trifluoromethylphenyl-4-methoxy-5-chloropyridazone-(6) (I), and for comparison, with 3 kg per hectare of 1-phenyl-4-methoxy-5-chloropyridazone-(6) (II) and 3 kg per hectare of N-p-chlorophenyl-N'-dimethylurea (III), these amounts of the active ingredients each being dispersed in 500 liters of water per hectare.

After four to five weeks it is ascertained that I has a stronger herbicidal action than II and superior plant compatibility over III.

The results of the experiment may be seen from the following table:

|  | Active ingredient | | |
|---|---|---|---|
|  | I | II | III |
| Indian corn | 10 | 10 | 20–30 |
| cotton | 0–10 | 10 | 20 |
| annual meadow grass | 90–100 | 80 | 90–100 |
| slender foxtail | 90–100 | 80 | 90–100 |
| barnyard grass | 90–100 | 70 | 90–100 |
| large crabgrass | 90 | 60 | 80–90 |
| white goosefoot | 100 | 90 | 90–100 |
| chickweed | 100 | 90 | 100 |
| amaranth pigweed | 80–90 | 60–70 | 80–90 |

0 = no damage
100 = total destruction

EXAMPLE 2

In a greenhouse the plants cotton (*Gossypium sp.*), rice (*Oryza sativa*), annual meadow grass (*Poa annua*), slender foxtail (*Alopecurus myosuroides*), barnyard grass (*Echinochloa crus-galli*), large crabgrass (*Digitaria sanguinalis*), white goosefoot (*Chenopodium album*), henbit (*Lamium amplexicaule*) and amarauth pigweed (*Amaranthus retroflexus*) are treated at a growth height of from 3 to 12 cm with 2kg per hectare of 1-m-trifluoromethylphenyl--methoxy-5-chloropyridazone-(6) (I), and, for comparison, with 2 kg per hectare of 1-phenyl-4-methoxy-5-chloropyridazone-(6)(II) and 2 kg per hectare of N-p-chlorophenyl-N'-dimethylurea (III), these amounts of the active ingredients each being dispersed in 500 liters of water per hectare.

After three to four weeks it is ascertained that I has a stronger herbicidal action than II and superior plant compatibility over III.

The results of the experiment may be seen from the following table:

|  | Active ingredient | | |
|---|---|---|---|
|  | I | II | III |
| cotton | 10 | 10 | 30–40 |
| rice | 10–20 | 10–20 | 50 |
| annual meadow grass | 90–100 | 80 | 90 |
| slender foxtail | 90–100 | 80 | 90–100 |
| barnyard grass | 90 | 70 | 90 |
| large crabgrass | 90 | 70 | 90 |
| white goosefoot | 90–100 | 80–90 | 90–100 |
| henbit | 90 | 70–80 | 90–100 |
| amaranth pigweed | 90 | 70–80 | 90 |

0 = damage
100 = total destruction

EXAMPLE 3

A site is sown with annual meadow grass (Poa annua), slender foxtail (Alopecurus myosuroides), barnyard grass (*Echinochloa crus-galli*), large crabgrass (*Digitaria sanguinalis*), white goosefoot (*Chenopodium album*), chickweed (*Stellaria media*) and amaranth pigweed (*Amaranthus retroflexus*) and sprayed on the same day with 5 kg per hectare of 1-m-trifluoromethylphenyl-4-methoxy-5-chloropyridazone-(6) (I), and, for comparison, with 5 kg per hectare of 2-chloro-4,6-bis-(ethylamino)-s-triazine (IV), these amounts of the active ingredients each being dispersed in 500 liters of water per hectare.

Whereas the plants treated with IV develop normally at first and gradually wither, the plants on the part of the site treated with I developed marked chlorosis even during germination; after 4 to 5 weeks all plants treated with I are almost completely withered, whereas both broadleaved and grassy weeds are still growing on that part of the site treated with IV.

EXAMPLE 4

A site with annual meadow grass (*Poa annua*), slender foxtail (*Alopecurus myosuroides*), barnyard grass (*Echinochloa crus-galli*), large crabgrass (*Digitaria sanguinalis*), white goosefoot (*Chenopodium album*), henbit (*Lamium amplexicaule*) and amaranth pigweed (*Amaranthus retroflexus*) growing on it is treated, at a growth height of the weeds of 2 to 7 cm, with 5 kg per hectare of 1-m-trifluoromethylphenyl-4-methoxy-5-chloropyridazone-(6) (I), and, for comparison with 5 kg per hectare of 2-chloro-4,6-bis-(ethylamino)-s-triazine (IV), these amounts of the active ingredients each being dispersed in 500 liters of water per hectare. After a few days it is observed that the broadleaved and grassy weeds treated with I develop chlorosis and wither, whereas the weeds treated with IV continue to grow normally. After four to eight weeks both broadleaved and grassy weeds treated with I are completely withered, whereas some weeds continues to grow on the areas treated with IV.

The following active ingredients are biologically as effective as I in Examples 1,2,3 and 4:

1-m-trifluorophenyl-4-methoxy-5-bromopyridazone-(6)
1-m-trifluorophenyl-4-amino-5-bromopyridazone-(6)
1-m-trifluorophenyl-4-amino-5-chloropyridazone-(6)
1-m-trifluoromethylphenyl-4,5-dimethoxypyridazone-(6)
1-m-trifluoromethylphenyl-4-diethylamino-5-bromopyridazone-(6)
1-m-trifluoromethylphenyl-4-dichloroacetylamino-5-bromopyridazone-(6)
1-m-trifluoromethylphenyl-4-acetylamino-5-bromopyridazone-(6)
N- [6-(1-m-trifluoromethyphenyl-5-bromopyridazone-6)-yl] -N-dimethylformamidine
N- [1-m-trifluoromethylphenyl-5-bromopyridazone-6)-yl-(4)] -oxamic acid
N- [1-m-trifluoromethylphenyl-5-bromopyridazone-6)-yl-(4)] -oxamic acid ethyl ester.

We claim:
1. 1-m-trifluoromethylphenyl-4-methoxy-5-chloropyridazone-(6).

2. 1-m-trifluoromethylphenyl-4-methoxy-5-bromopyridazone-(6).
3. 1-m-trifluoromethylphenyl-4-amino-5-bromopyridazone-(6).
4. 1-m-trifluoromethylphenyl-4-amino-5-chloropyridazone-(6).

* * * * *